United States Patent [19]

Lysandrou et al.

[11] Patent Number: 4,696,752

[45] Date of Patent: Sep. 29, 1987

[54] SYSTEM FOR ACIDIZING OIL AND GAS WELLS

[75] Inventors: Michael C. Lysandrou, Houston; Clarence L. Dulaney, Missouri City, both of Tex.

[73] Assignee: Standard Oil Company, Chicago, Ill.

[21] Appl. No.: 425,386

[22] Filed: Sep. 28, 1982

[51] Int. Cl.[4] .................... E21B 43/27; E21B 43/12
[52] U.S. Cl. .................... 252/8.553; 252/8.552; 252/8.554; 166/304; 166/307
[58] Field of Search .................... 166/304, 307; 252/8.55 C, 8.55 B, 8.55 D

[56] References Cited

U.S. PATENT DOCUMENTS

| | | | |
|---|---|---|---|
| 2,024,718 | 12/1935 | Chamberlain | 252/8.55 C |
| 3,819,520 | 6/1974 | Jones | 252/8.55 C |
| 3,954,636 | 5/1976 | Crowe | 166/307 X |
| 4,090,562 | 5/1978 | Maly | 252/8.55 B |

Primary Examiner—John F. Terapane
Assistant Examiner—Catherine S. Kilby

[57] ABSTRACT

A composition comprising methanol and ethanol, a propanol, or tertiary-butanol, or any combination thereof and a mixture of $C_6$-alcohols through $C_{10}$-alcohols is suitable for use in acidizing oil and gas wells.

1 Claim, No Drawings

SYSTEM FOR ACIDIZING OIL AND GAS WELLS

BACKGROUND OF THE INVENTION

Oil containing asphaltenes and paraffins is produced by certain oil wells. Such high molecular weight cyclic materials are, in extreme cases, in colloidal suspension in the crude oil.

In particular, colloidal asphaltenes tend to act as stabilizing agents for emulsion of water in the crude oil. Such emulsion is considerably more viscous than the crude and, consequently, increases the difficulty of removing the crude from the ground.

Asphaltenes and paraffins tend to precipitate from the crude as the temperature is lowered, as occurs when the oil leaves the formation and goes into the well bore. Co-precipitates form with any paraffins that may be in the oil and with inorganic materials, such as calcium carbonate, migrating clay particles, calcium sulfate, and the like. In an extreme case, such deposits may essentially stop the flow of oil from the well. Acidizing is used to remove the inorganic constituents, including conversion of insoluble sulfate salts to the more soluble carbonates.

In U.S. Pat. No. 3,819,520, Jones, et al., teach that a mixture of an octanol and a lower alcohol, such as ethanol, isopropyl alcohol, normal-propanol, or tertiary-butanol, can be used to acidize oil and gas wells. However, they exclude methanol from their composition and point out that methanol has too little solubilizing action for octanols. Contrary to this, it has now been found that a mixture of methanol and ethanol, isopropyl alcohol, normal-propanol, or tertiary-butanol, or any combination thereof dissolves $C_8$-alcohols and solubilizes asphaltenic deposits better than a miscible solvent containing only a propyl alcohol and $C_8$-alcohols.

SUMMARY OF THE INVENTION

There is provided a composition for use in acidizing oil and gas wells, which composition comprises methanol and ethanol, isopropyl alcohol, normal-propanol, or tertiary-butanol, or any combination thereof and a mixture of alcohols comprising about 10 wt % to about 100 wt % $C_8$-alcohols and about 90 wt % to about 0 wt % $C_6$-alcohols through $C_{10}$-alcohols.

DESCRIPTION AND PREFERRED EMBODIMENT

Acidizing is employed to remove inorganic materials, such as calcium carbonate, migrating clay particles, and calcium sulfate, which are formed in the well during drilling or are naturally occurring and which can, in extreme cases, essentially stop oil flow from the well. In order to get the acid to the inorganic damage, where it can react therewith, it is necessary to remove organic matter that may coat such solids. The organic matter can contain asphaltenic and paraffinic hydrocarbons which are not stripped easily with the conventional "mutual" solvent. Preferably, such deposits are stripped by the use of a "miscible" solvent that not only strips the organic deposit, but also causes the inorganic material to be water-wet. This condition facilitates the reaction of the acid with the inorganic deposit.

According to the present invention, there is provided a composition for use in acidizing oil and gas wells, which composition comprises about 1 wt % to about 50 wt % methanol, about 25 wt % to about 80 wt % ethanol, isopropyl alcohol, normal-propanol, or tertiary-butanol, or any combination thereof, and about 1 wt % to about 25 wt % $C_8$-alcohol, said $C_8$-alcohol comprising a mixture of alcohols, said mixture comprising about 10 wt % to about 100 wt % $C_8$-alcohols and about 90 wt % to 0 wt % $C_6$-alcohols through $C_{10}$-alcohols. Preferably, the composition comprises about 5 wt % to about 30 wt % methanol, about 50 wt % to about 75 wt % ethanol, isopropyl alcohol, normal-propanol, or tertiary-butanol, or any combination thereof, and about 7 wt % to about 15 wt % $C_8$-alcohol.

The term "$C_8$-alcohol" refers to a mixture of alcohols which comprises from 10 wt % to about 100 wt % $C_8$-alcohol and about 90 wt % to about 0 wt % $C_6$-alcohols through $C_{10}$-alcohols. In most cases, the $C_8$-alcohols will contain traces of $C_4$-alcohols and $C_{12}$-alcohols. It is to be understood that $C_8$-alcohols can be straight-or branched-chain or a combination of straight- and branched-chains and can be primary, secondary, or tertiary alcohols.

The composition of the present invention, which can be used for both onshore and offshore drilling operations, is used in conjunction with acids normally used in well acidizing, such as hydrochloric acid, mixed hydrochloric and hydrofluoric acids (mud acid), sulfamic acid, and organic acids, such as acetic acid and formic acid. It serves suitably as a miscible solvent in helping to put organic deposits into the aqueous (acid) phase and causing inorganic surfaces to be water-wet. The water-wetting properties in the presence of asphaltenic oils are particularly advantageous, since hydrochloric acid alone causes sludging with such crudes.

The following examples are being presented for the purpose of illustration only and are not intended to limit the scope of the present invention.

EXAMPLE I

Bottle tests were conducted with a preferred embodiment of the composition of the present invention, identified hereinafter as Composition A, in the presence of a highly asphaltenic crude, a Tensleep crude from Wyoming. Composition A was made up of 25 wt % methanol, 11.6 wt % 2-octanol (capryl alcohol), and 63.4 wt % isopropyl alcohol. In addition, bottle tests were conducted with prior art compositions, namely, (1) ethylene glycol monobutyl ether (EGMBE) and (2) a commercial solvent system sold by Amoco Chemicals Corporation and identified as "A-SOL." In each case, 300 ml of aqueous phase, i.e., solvent plus 15% hydrochloric acid solution, were mixed with 100 ml of the Tensleep crude oil in a pint bottle. The mixture was then permitted to settle overnight (approx. 16 hr). The viscosity of the oil layer was obtained by using a Brookfield viscometer with a No. 2 spindle at 12 rpm. The results of these tests are presented hereinbelow in Table I.

TABLE I

| | Viscosities of Oil Layers | | | |
|---|---|---|---|---|
| Vol of 15% HCl, cc | Solvent | Vol of Solvent, cc | Vol of Crude, cc | Viscosity of Crude Layer, Cps |
| 0 | — | 0 | 100 | 183 |
| 300 | — | 0 | 100 | 670 |
| 285 | EGMBE | 15 | 100 | 418 |
| 270 | EGMBE | 30 | 100 | 410 |
| 255 | EGMBE | 45 | 100 | 355 |
| 240 | EGMBE | 60 | 100 | 330 |
| 225 | EGMBE | 75 | 100 | 318 |
| 285 | A | 15 | 100 | 323 |

TABLE I-continued

| Vol of 15% HCl, cc | Solvent | Vol of Solvent, cc | Vol of Crude, cc | Viscosity of Crude Layer, Cps |
| --- | --- | --- | --- | --- |
| 270 | A | 30 | 100 | 220 |
| 255 | A | 45 | 100 | 220 |
| 240 | A | 60 | 100 | 180 |
| 225 | A | 75 | 100 | 168 |
| 285 | A-SOL | 15 | 100 | 418 |
| 270 | A-SOL | 30 | 100 | 348 |
| 255 | A-SOL | 45 | 100 | 285 |
| 240 | A-SOL | 60 | 100 | 203 |
| 225 | A-SOL | 75 | 100 | 168 |

Examination of the viscosities in Table I reveals that the viscosities furnished by the samples employing Composition A were, in general, less than the viscosities provided by the samples employing prior art solvents in equivalent concentrations. Lower viscosities indicate a superior solvent system.

EXAMPLE II

Samples of the composition of the present invention were titrated with hydrochloric acid, acetic acid, and formic acid solutions. It was found that the composition of the present invention is infinitely soluble in 25% or stronger hydrochloric acid solution, 25% or stronger acetic acid solution, and 15% or stronger formic acid solution. Such infinite miscibility can lead to improved economics in acid treatment of oil wells or gas wells.

What is claimed is:

1. A composition for use in acidizing oil and gas wells, which composition comprises about 25 wt % methanol, about 11.6 wt % 2-octanol, and about 63.4 wt % isopropyl alcohol.

* * * * *